US008236900B2

(12) United States Patent
Watanabe et al.

(10) Patent No.: US 8,236,900 B2
(45) Date of Patent: Aug. 7, 2012

(54) MODIFIED POLYOLEFIN RESIN AND USES THEREOF

(75) Inventors: Yasutaka Watanabe, Iwakuni (JP); Kenichi Fujino, Iwakuni (JP); Hidetoshi Yoshioka, Iwakuni (JP); Naoshi Nagai, Sodegaura (JP); Sadahiko Matsuura, Sodegaura (JP)

(73) Assignees: Nippon Paper Chemicals Co., Ltd., Tokyo (JP); Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/375,032

(22) PCT Filed: Jul. 18, 2007

(86) PCT No.: PCT/JP2007/064169
§ 371 (c)(1),
(2), (4) Date: Jan. 26, 2009

(87) PCT Pub. No.: WO2008/013085
PCT Pub. Date: Jan. 31, 2008

(65) Prior Publication Data
US 2010/0004383 A1    Jan. 7, 2010

(30) Foreign Application Priority Data
Jul. 25, 2006  (JP) .................................. 2006-202096

(51) Int. Cl.
*C08F 8/18*  (2006.01)
*C08F 8/46*  (2006.01)
*C08F 8/02*  (2006.01)

(52) U.S. Cl. ................... 525/326.1; 525/386; 525/355
(58) Field of Classification Search .................. 525/386, 525/355, 326.1
See application file for complete search history.

(56) References Cited

U.S. PATENT DOCUMENTS

| | | | | |
|---|---|---|---|---|
| 5,164,454 A * | 11/1992 | Suga et al. | ...................... | 525/309 |
| 6,459,005 B1 | 10/2002 | Hirano et al. | | |
| 7,109,284 B2 | 9/2006 | Ishii et al. | | |
| 2003/0027955 A1 * | 2/2003 | Ishii et al. | ...................... | 526/127 |
| 2005/0106385 A1 * | 5/2005 | Martin et al. | ................. | 428/343 |
| 2005/0171271 A1 | 8/2005 | Fujino et al. | | |
| 2007/0191547 A1 | 8/2007 | Sekiguchi | | |

FOREIGN PATENT DOCUMENTS

| | | |
|---|---|---|
| EP | 0 859 042 A1 | 8/1998 |
| EP | 1 211 269 A1 | 6/2002 |
| EP | 1 270 603 A2 | 1/2003 |
| EP | 1 270 603 A3 | 1/2003 |
| EP | 1 469 035 A1 | 10/2004 |
| EP | 1 719 786 A1 | 11/2006 |
| JP | 1 304164 | 12/1989 |
| JP | 3-199283 A | 8/1991 |
| JP | 5 125111 | 5/1993 |
| JP | 6 145637 | 5/1994 |
| JP | 7-196710 A | 8/1995 |
| JP | 10-245576 A | 9/1998 |
| JP | 2000-80134 A | 3/2000 |
| JP | 2000 351813 | 12/2000 |
| JP | 2001 2731 | 1/2001 |
| JP | 2003 12720 | 1/2003 |
| JP | 2003 73412 | 3/2003 |
| JP | 2003 321588 | 11/2003 |
| JP | 2003 327761 | 11/2003 |
| JP | 2004 26908 | 1/2004 |
| JP | 2004 217807 | 8/2004 |
| JP | 2007-511658 A | 5/2007 |
| WO | 2005 082963 | 9/2005 |
| WO | WO 2006/044522 A1 | 4/2006 |
| WO | 2006 057229 | 6/2006 |

OTHER PUBLICATIONS

Extended European Search Report issued Oct. 29, 2009 in PCT/JP2007064169.
Japanese Office Action issued on Jul. 5, 2011 in corresponding Japanese Application No. 2008-526735 (with an English Translation).

* cited by examiner

*Primary Examiner* — Ling Choi
(74) *Attorney, Agent, or Firm* — Oblon, Spivak, McClelland, Maier & Neustadt, L.L.P.

(57) ABSTRACT

It is an object of the present invention to provide a modified polyolefin resin adhesive agent which is excellent in adhesiveness to a nonpolar substrate, particularly a poorly adhesive polyolefin substrate to which no surface treatment has been given and to a polar substrate, develops the excellent adhesiveness by drying or thermal compression bonding at relatively low temperature, and exhibits a low tack. That is, the present invention provides the modified polyolefin resin obtained by modifying a polyolefin resin with (A) a polarity imparting agent which is at least one selected from chlorine, unsaturated carboxylic acid, derivatives and anhydrides of unsaturated carboxylic acid and radical polymerizable monomers; and (B) an ethylene-α-olefin copolymer having an unsaturated bond at one end, and use of said modified polyolefin resin as an aqueous resin composition or an organic solvent resin composition.

18 Claims, No Drawings

MODIFIED POLYOLEFIN RESIN AND USES THEREOF

TECHNICAL FIELD

The present invention relates to a modified polyolefin resin which is excellent in adhesiveness to a nonpolar substrate, particularly a polyolefin substrate which no surface treatment is given to and is poorly adhesive, and to a polar substrate; develops the excellent adhesiveness by drying or thermal compression bonding at low temperature; and has a low tack.

BACKGROUND ART

Conventionally, polyolefin resins such as polypropylene and polyethylene resins have been used as sheets, films and molded products in a wide range of areas because they are thermoplastic resins used commonly, are inexpensive and excellent in moldability, chemical resistance, weather resistance, water resistance and electric property. However, substrates composed of these polyolefin resins (hereinafter, polyolefin substrates) are low polar and crystalline, so known as the poorly adhesive substrate differently from polar substrates such as polyurethane resins, polyamide resins, acrylic resins, polyester resins and metals, and have a shortcoming that adhesion and painting between the same type substrates or between the different type substrates are difficult.

As methods for enhancing the adhesiveness of the polyolefin substrate, the surface treatment of the substrate, for example, making a rough surface by polish, or introduction of a polar group by an oxidant, a corona discharge, a plasma treatment or a flame treatment has been conventionally available. However, these have poor reproducibility for obtaining a certain effect, require works with toxicity and risk, and have the shortcoming that the effect is reduced with time. Thus, they have not become common generally.

Thus, the method of previously coating a substrate surface with a pretreating agent having the adhesiveness has been invented. Such a pretreating agent has various names, and is referred to as, for example, an adhesive agent, a binder or a primer depending on its intended use. As the pretreating agent, for example, the resin having a predetermined property is used. The pretreating agents, e.g., a hot melt system where the resin is melted with heat to make the binder, a solvent system where the resin is dissolved in the solvent and an aqueous system where the resin is emulsified using a surfactant have been provided.

As a specific example of them, the method of increasing affinity to the substrates of polyolefin, polyvinyl chloride, polycarbonate, PET, ABS or nylon to enhance the adhesiveness by the method of using a carboxyl group-containing chlorinated polyolefin resin as a coating composition for the binder and the primer, described in Patent Publication JP 2003-321588(A), is available.

Furthermore, the method of increasing affinity with the polyolefin substrate to enhance the adhesiveness by imparting the polar group to polyolefin by graft modification with unsaturated carboxylic acid and an acrylic derivative and using this as a coating agent, described in International Publication No. 2005/082963 Pamphlet, has been found. These methods enable to paint and adhere onto the polypropylene substrate and various polar substrates, but have no adherent effect required practically on the polyethylene substrate which is more nonpolar and poorly adherent.

Polyethylene is broadly classified into low density polyethylene (LDPE), linear low density polyethylene (LLDPE) and high density polyethylene (HDPE) depending on differences of their production methods and resulting density. Adhesion is difficult in common to these substrates because polyethylene is nonpolar, has low surface energy and is highly crystalline.

Thus, in order to solve this problem, it has been attempted that polyethylene is adhered by an adherent primer composed of: a graft polymerized product of an ethylene-vinyl acetate copolymer and unsaturated dicarboxylic acid or anhydride thereof; lowly chlorinated polypropylene or lowly chlorinated polyethylene; and a solvent, described in Patent Publication JP H01-304164(A). However, its effect is limited to high density polyethylene where the adhesion is relatively easy among the above three classifications of polyethylene, and thermal compression bonding at high temperature is required. Thus, there is a problem that the substrate is deformed.

In the method of using crystalline polyamide described in Patent Publication JP H06-145637(A), the adhesion effect is likewise limited to high density polyethylene; a physical treatment to previously form scratch marks on an adhesion surface by a wire brush is required; and further, the solvent in which this adhesive agent is soluble is phenols mainly composed of cresol, or strong acids such as formic acid, concentrated sulfuric acid and concentrated hydrochloric acid. Thus, there are problems in safety and workability.

Also the method of giving the adhesion effect to polypropylene and polyethylene by controlling a composition ratio of ethylene/propylene using an ethylene-propylene copolymer is generally available. However, it is difficult to balance the adhesiveness to both substrates, and the tack is likely generated.

This way, various adhesive agents and adhesion technologies for polyethylene have been proposed, but nothing having the effect on all of low density polyethylene, linear low density polyethylene and high density polyethylene which are different in physical property and having the adhesiveness to the other polyolefin substrates and the polar substrates simultaneously is available at all.

Accordingly, an adhesive agent exhaustively having the adhesiveness to the polyolefin substrates including the above various polyethylene and the various polar substrates, having a good coating property and capable of adhering at low temperature has been required.

DISCLOSURE OF INVENTION

Problem to Be Solved By the Invention

It is an object of the present invention to provide a modified polyolefin resin adhesive agent having widely applicable adhesiveness to nonpolar substrates, particularly polyolefin substrates, i.e., various polyethylene (LDPE, LLDPE, HDPE and the like) and polypropylene, which no surface treatment is given to and are poorly adhesive, and to the polar substrates, having a good coating property, developing the excellent adhesiveness by drying and thermal compression bonding at low temperature and having a low tack.

Means for Solving Problem

As a result of an extensive study in the light of the above problems, the present inventors found that a polyolefin resin modified with (A) a polarity imparting agent and (B) a copolymer having an unsaturated bond at one end composed of ethylene and α-olefin having 3 to 10 carbon atoms was excellent in solvent solubility and coating property and develops a sufficient adhesive force by treating at low temperature to untreated low density polyethylene, linear low density polyethylene and high density polyethylene in addition to surface-untreated polypropylene and PET, and thus have completed the present invention.

[1] A modified polyolefin resin obtained by modifying a polyolefin resin using the following (A) and (B):
   (A) one or more polarity imparting agents selected from chlorine, an unsaturated carboxylic acid, a derivative and anhydrides of unsaturated carboxylic acid, and radical polymerizable monomers; and
   (B) an ethylene-α-olefin copolymer wherein a ratio of main chain ends having an unsaturated bond at one end is 90% or more.
[2] The modified polyolefin resin according to [1], wherein said polyolefin resin is at least one selected from an polypropylene, an ethylene-propylene copolymer, an propylene-butene copolymer and an ethylene-propylene-butene copolymer.
[3] The modified polyolefin resin according to [1], wherein said (A) polarity imparting agent is a combination of an unsaturated carboxylic anhydride and an methacrylate ester.
[4] An aqueous resin composition containing the modified polyolefin resin according to [1].
[5] An organic solvent resin composition containing the modified polyolefin resin according to [1].

Effect of the Invention

The modified polyolefin resin of the present invention is excellent in solvent solubility and coating property, has the excellent adhesiveness to the nonpolar substrates such as polypropylene, low density polyethylene, linear low density polyethylene and high density polyethylene substrates and the polar substrates such as polyester including PET, and can develop the sufficiently excellent adhesive force by drying or thermal compression bonding at low temperature. In particular, this has the equivalent adhesive force to various polyethylene substrates such as low density polyethylene, linear low density polyethylene and high density polyethylene substrates.

BEST MODES FOR CARRYING OUT THE INVENTION

The present invention will be described in detail below.

The present invention provides a modified polyolefin resin having an exhaustively excellent adhesiveness to various nonpolar and polar substrates, which is obtained by modifying a polyolefin resin with a polarity imparting agent and an ethylene-α-olefin copolymer.

Examples of the polyolefin resin used as a raw material of the modified polyolefin resin in the present invention may include those obtained by copolymerizing ethylene or α-olefin using Ziegler-Natta catalyst or a metallocene catalyst as a polymerization catalyst. As more specific examples, the resin selected from polypropylene, ethylene-propylene copolymers, propylene-butene copolymers and ethylene-propylene-butene copolymers may be shown. These resins may be used alone or in combination of two or more. As the polyolefin resin used in the present invention, at least one selected from polypropylene, the ethylene-propylene copolymers, the propylene-butene copolymers and ethylene-propylene-butene copolymers (hereinafter these are sometimes collectively referred to as propylene-based random copolymers) produced using the metallocene catalyst as the polymerization catalyst is preferable among the above resins, and among them, the propylene-based random copolymer having a melting point (Tm) of 60 to 165° C. measured by a differential scanning calorimeter (DSC) is preferable.

As the aforementioned metallocene catalyst, those known publicly may be used. Specifically, the catalyst obtained by combining components (1) and (2), and further if necessary the component (3) described below is desirable.

Component (1): a metallocene complex which is a transition metal compound in 4 to 6 groups in a periodic table, having at least one conjugated 5-membered ligand.

Component (2): an ion exchangeable lamellar silicate salt.

Component (3): an organic aluminium compound

The polyolefin resin synthesized using the metallocene catalyst is characterized in that a molecular weight distribution is narrow, a composition distribution is narrow with being excellent in random copolymerizable property and a range of copolymerizable comonomers is wide, and is preferable as the polyolefin resin used in the present invention.

The measurement of Tm by DSC in the present invention can be performed under the following condition. Using a DSC measurement apparatus (supplied from Seiko Instruments Inc.), about 10 mg of a sample is melted at 200° C. for 5 minutes, then crystallized by cooling to −60° C. at a rate of 10° C./minute, further the temperature is raised at a rate of 10° C./minute to 200° C., a temperature of a melting peak when the sample is melted is measured, and the temperature is evaluated as Tm. Tm in Examples described later was measured under the above condition.

A component composition of the polyolefin resin used in the present invention is not particularly limited, but an amount of a propylene component is preferably 60 mol % or more. When it is less than 60 mol %, the adhesiveness to the propylene substrate is likely to be reduced.

The molecular weight of the polyolefin resin used in the present invention is not particularly limited. However, a weight average molecular weight of the modified polyolefin resin modified with the polarity imparting agent and the ethylene-α-olefin copolymer described later is preferably 15,000 to 200,000. Thus, when the weight average molecular weight of the polyolefin resin is more than 200,000, it is preferable to adjust its molecular weight to the appropriate range, e.g., 200,000 or less by degrading in the presence of heat or radical so that the weight average molecular weight of the resulting modified polyolefin resin consists in the above range. The weight average molecular weight and the molecular weight distribution (Mw/Mn) in the present invention including Examples are values measured by gel permeation chromatography (standard substance: polystyrene).

The modified polyolefin resin of the present invention is obtained by modifying the aforementioned polyolefin resin. Upon modification, one or more selected from chlorine, unsaturated carboxylic acid, derivatives and anhydride of unsaturated carboxylic acid, and radical polymerizable monomers are used as (A) the polarity imparting agent. These (A) polarity imparting agents may be used in combination of two or more.

In the following description, the resin obtained when at least chlorine is used as the polarity imparting agent for the polyolefin resin is referred to as a chlorinated modified polyolefin resin, whereas when chlorine is not used as the polarity imparting agent, the resin is referred to as a non-chlorinated polyolefin resin. The polyolefin resins modified with the polarity imparting agent and the ethylene-α-olefin copolymer are referred to as a modified polyolefin resins on the whole regardless of using or not using chlorine as the polarity imparting agent.

A chlorine content in the chlorinated modified polyolefin resin is not particularly limited, but is preferably 2 to 35% by weight and particularly preferably 4 to 25% by weight. When the content is less than 2% by weight, the adhesiveness to the various nonpolar substrates becomes good, but the solubility in the organic solvent is likely to be reduced. When it is more than 35% by weight, the adhesiveness to the various nonpolar substrates is likely to be reduced. The chlorine content can be measured in accordance with JIS-K7229. That is, the content can be measured using an "oxygen flask combustion method" of quantifying by burning a chlorine containing resin under an oxygen atmosphere, absorbing a generated chlorine gas with water and titrating it.

Unsaturated carboxylic acid in the present invention means an unsaturated compound containing a carboxylic group. The derivative of unsaturated carboxylic acid means mono- or di-ester, amide or imide of the compound. The anhydride of unsaturated carboxylic acid means the anhydride of the compound. Examples of unsaturated carboxylic acid, the derivative and anhydride of unsaturated carboxylic acid may include fumaric acid, maleic acid, itaconic acid, citraconic acid, aconitic acid, nadic acid, and anhydrides thereof; methyl fumarate, ethyl fumarate, propyl fumarate, butyl fumarate, dimethyl fumarate, diethyl fumarate, dipropyl fumarate, dibutyl fumarate, methyl maleate, ethyl maleate, propyl maleate, butyl maleate, dimethyl maleate, diethyl maleate, dipropyl maleate, dibutyl maleate, maleimide and N-phenylmaleimide. Among them, the anhydride of unsaturated carboxylic acid is preferable, and itaconic anhydride and maleic anhydride are particularly preferable. Unsaturated carboxylic acid, the derivative and anhydride of unsaturated carboxylic acid may be used alone or in combination of two or more.

A sum of graft weights of unsaturated carboxylic acid, the derivative and anhydride of unsaturated carboxylic acid in the modified polyolefin resin is preferably 0.1 to 20% by weight and particularly preferably 0.5 to 12% by weight. When chlorine is not used as the polarity imparting agent, the sum of graft weights of unsaturated carboxylic acid, the derivative and anhydride of unsaturated carboxylic acid in the non-chlorinated modified polyolefin resin is preferably 0.5 to 20% by weight and particularly preferably 1 to 10% by weight.

When the compound alone selected from unsaturated carboxylic acid, the derivative and anhydride of unsaturated carboxylic acid is used as the polarity imparting agent, if the graft weight is lower than the above preferable range, the adhesiveness of an adhesive composition to a polar adherend is reduced. Conversely, if it is too high, this is not preferable because unreacted materials occur aboundingly and the adhesiveness to a nonpolar adherend is reduced.

The graft weight percent of unsaturated carboxylic acid, the derivative and anhydride of unsaturated carboxylic acid can be obtained by an alkali titration method or Fourier transform infrared spectroscopy, and numerical values shown in Examples described later are the values measured by these methods.

The radical polymerizable monomer in the present invention means a (meth)acrylic compound or a vinyl compound. The (meth)acrylic compound is the compound containing at least one (meth)acryloyl group in its molecule ((meth)acryloyl group means an acryloyl group and/or a methacryloyl group). Examples of the radical polymerizable monomer may include (meth)acrylic acid, methyl (meth)acrylate, ethyl (meth)acrylate, n-butyl (meth)acrylate, cyclohexyl(meth) acrylate, hydroxyethyl (meth)acrylate, isobornyl (meth)acrylate, glycidyl (meth)acrylate, octyl (meth)acrylate, lauryl (meth)acrylate, tridecyl (meth)acrylate, stearyl (meth)acrylate, cyclohexyl (meth)acrylate, benzyl (meth)acrylate, phenyl (meth)acrylate, dimethylaminoethyl (meth)acrylate, diethylaminoethyl (meth)acrylate, hydroxyethyl (meth)acrylate, 2-hydroxyethyl (meth)acrylate, N,N-dimethylaminoethyl (meth)acrylate, acetoacetoxyethyl (meth)acrylate, N-methyl(meth)acrylamide, N-ethyl(meth)acrylamide, N-propyl (meth)acrylamide, N-isopropyl(meth)acrylamide, N-butyl (meth)acrylamide, N-isobutyl(meth)acrylamide, N-t-butyl (meth)acrylamide, N,N-dimethyl(meth)acrylamide, N,N-dimethylaminopropyl(meth)acrylamide, N,N-methylene-bis (meth)acrylamide, N-methylol(meth)acrylamide, hydroxyethyl(meth)acrylamide, (meth)acryloylmorpholine, n-butylvinyl ether, 4-hydroxybutylvinyl ether and dodecylvinyl ether. Particularly, methyl (meth)acrylate, ethyl (meth) acrylate, cyclohexyl (meth)acrylate and lauryl (meth)acrylate are preferable, and among them, methacrylate thereof is preferable. These may be used alone or in mixture of two or more, and a mixed ratio thereof can be freely determined.

As the (meth)acrylic compound, those containing 20% by weight or more of one or more compounds selected from (meth)acrylate esters represented by the following general formula (I) are preferable. When such a (meth)acrylic compound is used, the molecular weight distribution of the modified polyolefin resin can be narrowed, and the solvent solubility of the modified polyolefin resin and its compatibility with other resins can be further enhanced.

  (I):

(In the formula (I), $R_1$ represents H or $CH_3$, $R_2$ represents $C_nH_{2n+1}$, and n represents an integer of 1 to 18.)

In the above general formula (I), n is preferably the integer of 8 to 18.

The graft weight of the radical polymerizable monomer in the modified polyolefin resin is preferably 0.1 to 30% by weight and particularly preferably 0.5 to 20% by weight. When the graft weight is less than 0.1% by weight, the solubility of the modified polyolefin resin, its compatibility with other resins and its adhesive force to other resins are reduced. When the graft weight is more than 30% by weight, an ultra-high molecular weight body is formed because of high reactivity to worsen the solvent solubility and the amounts of the produced homopolymer and copolymer which do not graft to a polyolefin skeleton are increased; thus, this is not preferable.

When chlorine is not used as the polarity imparting agent, the graft weight of the radical polymerizable monomer in the non-chlorinated modified polyolefin resin is preferably 0.5 to 30% by weight and particularly preferably 1 to 20% by weight.

The graft weight of the radical polymerizable monomer can be obtained by the Fourier transform infrared spectroscopy or 1H-NMR, and the numerical values shown in Examples described later are the values measured by these methods.

In the present invention, the combination of chlorine and the unsaturated carboxylic anhydride or the combination of the unsaturated carboxylic anhydride and methacrylate ester is preferable in the aforementioned polarity imparting agents. In particular, the combination of the unsaturated carboxylic anhydride and methacrylate ester is preferable In the present invention, the total content of the polarity imparting agent which occupies in the modified polyolefin resin is 0.1 to 35% by weight, preferably 1 to 20% by weight and more preferably 3 to 15% by weight. When the content is less than 0.1% by weight, the solubility of the modified polyolefin resin, its compatibility with other resins and its adhesive force to other resins are likely to be reduced. When the content is more than 35% by weight, the solubility and the adhesiveness are likely to be reduced. The total content of the polarity imparting agent which occupies in the modified polyolefin resin means the total amount of the content of chlorine and the graft weight percents of the polarity imparting agents when chlorine is used as the polarity imparting agent; and it means the total amount of the graft weight percents of the respective polarity imparting agents when chlorine is not used as the polarity imparting agent.

In the modified polyolefin resin of the present invention, (B) the ethylene-α-olefin copolymer is used in addition to (A) the aforementioned polarity imparting agent when the polyolefin resin is modified. The ethylene-α-olefin copolymer in the present invention is the copolymer composed of ethylene and α-olefin having 3 to 10 carbon atoms. In a component ratio of ethylene and α-olefin having 3 to 10 carbon atoms (e.g., propylene) in the ethylene-α-olefin copolymer, it is preferable that an ethylene unit is 80 to 100 mol % and an α-olefin unit having 3 to 10 carbon atoms is 0 to 20 mol %. When the ratio of the ethylene unit is higher, the adhesiveness to various polyethylene such as low density polyethylene (LDPE), linear low density polyethylene (LLDPE) and high density polyethylene (HDPE) is higher. Thus, those containing 100 mol % of the ethylene unit is particularly preferable. When the α-olefin unit exceeds 20 mol %, the adhesiveness to the polyethylene substrate is reduced. Meanwhile, the carbon atoms in α-olefin contained in the ethylene-α-olefin copolymer exceeds 10, the solubility in the solvent is reduced.

The ethylene-α-olefin copolymer used in the present invention is required to have an unsaturated bond at one end in its molecule. The ratio of main chain ends having the unsaturated bond at one end is at least 90% or more in the ethylene-α-olefin copolymer in the present invention. If the copolymer does not have 90% or more of the unsaturated bond at one end, the effect of the present invention can not be exerted.

The method for producing the ethylene-α-olefin copolymer used in the present invention is not particularly limited as long as the ratio of the main chain ends having the unsaturated bond at one end is 90% or more. For example, it is possible to produce by the methods known publicly described in Patent Publications: JP 2000-351813(A), JP 2001-2731(A), JP 2003-73412(A), JP 2004-26908(A) and International Publication NO. 2006/057229 Pamphlet.

The weight average molecular weight of the ethylene-α-olefin copolymer used in the present invention is preferably in the range of 800 to 30,000 and particularly preferably 1,000 to 20,000. Its molecular weight distribution (Mw/Mn) is preferably 3 or less. When the weight average molecular weight is less than 800, the solvent solubility of the modified polyolefin resin obtained by grafting the ethylene-α-olefin copolymer is enhanced, but there is a possibility that a tack property is worsened and the adhesive force to polyethylene is reduced. When the weight average molecular weight exceeds 30,000, there is a possibility that the solvent solubility is worsened. Meanwhile, when the molecular weight distribution exceeds 3, the tack property is likely to be worsened by increasing an absolute amount of the ethylene-α-olefin copolymer having the low molecular weight. The composition ratio of the ethylene-α-olefin copolymer and the ratio of the main chain ends having the unsaturated bond at one end can be obtained by the Fourier transform infrared spectroscopy, and were obtained according to this in Examples described later.

The content of the ethylene-α-olefin copolymer in the modified polyolefin copolymer is not particularly limited, but is preferably 0.5 to 30% by weight and more preferably 2 to 20% by weight, thereby being capable of obtaining the modified polyolefin resin which is excellent in adhesive force to various substrates and solvent solubility. When the content of the ethylene-α-olefin copolymer in the modified polyolefin copolymer is less than 0.5% by weight, the adhesiveness to polypropylene and the polar substrates is good, but it is likely that the sufficient adhesive force to polyethylene can not be obtained. Meanwhile, when it exceeds 30% by weight, there is a possibility that the solubility in various solvents is worsened.

The method for obtaining the modified polyolefin resin by modifying the polyolefin resin using the polarity imparting agent other than chlorine and ethylene-α-olefin is not particularly limited. It is possible to carry out by the publicly known method for obtaining the modified polyolefin resin by graft-polymerizing the polarity imparting agent and the ethylene-α-olefin copolymer to the polyolefin resin. As the methods for obtaining the modified polyolefin resin, for example, a solution method in which a mixture of the polyolefin resin, the polarity imparting agent and the ethylene-α-olefin copolymer is heated and dissolved in the solvent such as toluene and a radical generating agent is added; and a melting kneading method in which the polyolefin resin, the polarity imparting agent, the ethylene-α-olefin copolymer and the radical generating agent are added and kneaded using a banbury mixer, a kneader or an extruder. When one or more compounds selected from unsaturated carboxylic acid, the derivatives and anhydrides of unsaturated carboxylic acid and the radical polymerizable monomers are used as the polarity imparting agents, they may be added together or may be added sequentially.

When the polarity imparting agent other than chlorine and the ethylene-α-olefin copolymer are graft-polymerized to the polyolefin resin, a polymerization order is not limited. The polarity imparting agent other than chlorine and the ethylene-α-olefin copolymer may be graft-polymerized simultaneously or separately. Alternatively, the polyolefin resins graft-polymerized may be mixed with respective components. When they are graft-polymerized separately, it is preferable that the ethylene-α-olefin copolymer is graft-polymerized in advance and subsequently the polarity imparting agent other than chlorine is graft-polymerized.

The radical generating agent which can be used for the reaction to graft-polymerize the polarity imparting agent other than chlorine and the ethylene-α-olefin copolymer to the polyolefin resin can be appropriately selected from those known publicly. In particular, organic peroxide compounds are preferable. Examples thereof may include di-t-butyl peroxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)-cyclohexane, cyclohexanone peroxide, t-butylperoxy benzoate, t-butylperoxy isobutyrate, t-butylperoxy-3,5,5-trimethylhexanoate, t-butylperoxy-2-ethylhexanoate, t-butylperoxyisopropyl carbonate and cumylperoxy octoate. Among them, di-t-butyl peroxide, dicumyl peroxide and dilauryl peroxide are preferable. The amount of the radical generating agent to be added to the polyolefin resin is preferably 1 to 50% by weight and particularly preferably 3 to 30% by weight relative to the weight of the amounts of the polarity imparting agent other than chlorine plus the ethylene-α-olefin copolymer. When the amount is less than this range, a graft ratio is likely to be reduced. When the amount exceeds this range, it is uneconomic.

When the compound selected from unsaturated carboxylic acid, the derivatives and anhydrides of unsaturated carboxylic acid and the radical polymerizable monomers is used as the polarity imparting agent, styrene, o-, p-, and α-methylstyrene, divinylbenzene, hexadiene and dicyclopentadiene may be added as a reaction aid.

Meanwhile, when chlorine alone is used as the polarity imparting agent, it is preferable that the ethylene-α-olefin copolymer is graft-polymerized to the polyolefin resin by the aforementioned solution method or melting kneading method and subsequently the resulting copolymer is chlorinated.

As the method for chlorination, for example, it is preferable to obtain the chlorinated polyolefin resin by dissolving the polyolefin resin graft-polymerized with the ethylene-α-olefin copolymer in the solvent such as chloroform and subsequently injecting gaseous chlorine with irradiating the ultraviolet light or in the presence of the radical generating agent. The ratio of chlorine to be introduced varies depending on difference of factors such as a type of the polyolefin resin, a reaction scale and a reaction apparatus. Thus, the content of chlorine can be controlled by monitoring the amount and a time period of injected chlorine.

If the chlorination is performed before the graft polymerization of the ethylene-α-olefin copolymer to the polyolefin resin, there is a possibility that de-hydrochloric acid occurs due to the graft polymerization. However, the ethylene-α-olefin copolymer may be grafted by the solution method at low temperature after the chlorination, if necessary.

And when as the polarity imparting agents, chlorine is combined with one or more compounds selected from unsaturated carboxylic acid, the derivatives and anhydrides of unsaturated carboxylic acid and the radical polymerizable monomers, it is preferable to perform a chlorination step at the last. That is, it is preferable that the ethylene-α-olefin copolymer and one or more compounds selected from unsaturated carboxylic acid, the derivatives and anhydrides of unsaturated carboxylic acid and the radical polymerizable monomers are graft-polymerized to the polyolefin resin by the solution method or the melting kneading method and subsequently the resulting copolymer is chlorinated by the aforementioned method. If the chlorination step is performed before the graft polymerization of the ethylene-α-olefin copolymer and one or more compounds selected from unsaturated carboxylic acid, the derivatives and anhydrides of unsaturated carboxylic acid and the radical polymerizable monomers, there is the possibility that de-hydrochloric acid occurs due to the graft polymerization. Thus, this is not preferable. However, the graft polymerization may be performed by the solution method at low temperature, if necessary.

When the compound containing ester such as (meth)acrylate ester is used as the radical polymerizable monomer, there is the possibility that the ester is degraded by the chlorination. Thus, it is preferable that such a compound is graft-polymerized after the chlorination step.

The modified polyolefin resin of the present invention can work as an intermediate medium for the substrate where the coating such as painting is difficult due to its low adhesiveness. For example, the modified polyolefin resin of the present invention is useful as the adhesive agent between polyolefin substrates such as polypropylene and polyethylene having the poor adhesiveness, and can be used regardless of the presence or absence of the surface treatment with plasma or corona on the surface of the substrate. Furthermore, adhesive stability of painting materials can be enhanced by laminating the modified polyolefin resin of the present invention on the surface of the polyolefin substrate by a hot melt mode and further coating the painting materials thereon. Moreover, it is possible to apply to the polar substrates such as polyester such as polyethylene terephthalate, polyurethane and polyamide. That is, the modified polyolefin resin of the present invention can be used suitably as the adhesive agents, primers, binders for painting or binders for inks.

The modified polyolefin resin of the present invention can be used in a form depending on the intended use, e.g., a solid such as powders or pellets, an organic solvent based resin composition and an aqueous resin composition. At that time, additives, e.g., antioxidants, light stabilizing agents, ultraviolet light absorbers, pigments, dyes and inorganic fillers can be combined if necessary.

When the modified polyolefin resin of the present invention is used as the organic solvent resin composition, aromatic solvents such as toluene and xylene, ester solvents such as ethyl acetate and butyl acetate, ketone solvents such as methyl ethyl ketone and methyl butyl ketone, alicyclic solvents such as cyclohexane and methylcyclohexane and ethylcyclohexane, and aliphatic solvents such as nonane and decane may be used alone or as the mixture. Among them, it is desirable in terms of environmental issues not to use the aromatic solvent, and it is particularly preferable to use the mixture of the alicyclic solvent and the ester solvent or the ketone solvent. Furthermore, in order to enhance a storage stability of a resin solution, 1 to 20% by weight of alcohol such as methanol, ethanol, propanol, isopropanol and butanol, and propylene glycol ester such as propylene glycol methyl ether, propylene glycol ethyl ether and propylene glycol t-butyl ether alone or in mixture of two or more may be added to the above solvent.

When the modified polyolefin resin of the present invention is used as the aqueous resin composition, it may be emulsified by any of a forced emulsification method, a phase inversion emulsification method, a D phase emulsification method and a gel emulsification method, which are known publicly. A surfactant may be used if necessary in order to disperse and emulsify the modified polyolefin resin of the present invention in water, and any of nonionic surfactants and anionic surfactants may be used. The nonionic surfactant is more preferable because the water resistance of the emulsified aqueous resin composition is better.

The nonionic surfactant may include polyoxyethylene alkyl ether, polyoxyethylene polyoxypropylene alkyl ether, polyoxyethylene derivatives, polyoxyethylene fatty acid ester, polyoxyethylene polyvalent alcohol fatty acid ester, polyoxyethylene polyoxypropylene polyol, sorbitan fatty acid ester, polyoxyethylene cured castor oil, polyoxyalkylene polycyclic phenyl ether, polyoxyethylene alkylamine, alkylalkanolamide and polyalkylene glycol(meth)acrylate. Preferably, polyoxyethylene alkyl ether, polyoxyethylene fatty acid ester, polyoxyethylene sorbitan fatty acid ester and polyoxyethylene alkylamine may be included.

The anionic surfactant may include alkyl sulfate ester salts, polyoxyethylene alkyl ether sulfate salts, alkylbenzene sulfonate salts, α-olefin sulfonate salts, methyl taurylate salts, sulfosuccinate salts, ether sulfonate salts, ether carboxylate salts, fatty acid salts, naphthalene sulfonate formalin condensates, alkylamine salts, quaternary ammonium salts, alkyl betaine and alkylamine oxide, and preferably may include polyoxyethylene alkyl ether sulfate salts and sulfosuccinate salts.

The amount of the surfactant to be added is 0.1 to 30% by weight and more preferably 5 to 20% by weight based on the amount of the modified polyolefin resin composition. When the amount exceeds 30% by weight, the adhesiveness and the water resistance are remarkably reduced by the excessive emulsifier which exceeds the amount required for forming the aqueous resin composition, and a plastic effect and a bleed phenomenon are caused and blocking occurs easily when a dry coating film is made. Thus, this is not preferable.

A pH value of the aqueous resin composition using the modified polyolefin resin of the present invention is preferably 5 or more and more preferably 6 to 10. When the pH value is less than 5, the modified polyolefin resin is not dispersed in water because neutralization is insufficient. Alternatively, even if it is dispersed, it is easily precipitated and separated with time, and the storage stability is likely to be worsened, which is thus not preferable. When the pH value exceeds 10, problems possibly occur in compatibility with the other component and safety while at work. For the purpose of neutralizing an acidic component in the modified polyolefin resin and dispersing it in water, a basic substance may be added if necessary. The basic substance may include sodium hydroxide, potassium hydroxide, ammonia, methylamine, propylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol, morpholine and dimethylethanolamine. More preferably, ammonia, triethylamine, 2-amino-2-methyl-1-propanol, morpholine and dimethylethanolamine may be included. Its amount to be used can be optionally controlled depending on the amount of the acidic component in the modified polyolefin resin, but it is preferable to add the basic substance so that the pH value of the aqueous resin composition is 5 or more and preferably 6 to 10. Upon obtaining the modified polyolefin resin, when the derivative and/or anhydride of unsaturated carboxylic acid and the radical polymerizable monomer as the polarity imparting agents are grafted with high modification degree and an emulsified product is made by self-emulsifying property thereof without using the surfactant, it is preferable to use sodium hydroxide or potassium hydroxide as the strong basic substance.

In the aqueous resin composition using the modified polyolefin resin of the present invention, an average particle diameter of the resin emulsified and dispersed in water is adjusted to preferably 300 nm or less and more preferably 200 nm or less. When it exceeds 300 nm, it is likely that the storage stability of the aqueous resin composition and its compatibility with other resins are worsened and coating film physical properties such as adhesiveness to the substrate, solvent resistance, water resistance and blocking resistance are reduced. It is possible to reduce the particle diameter endlessly, but in this case, the amount of the emulsifier to be added is generally increased, and the coating film physical properties such as adhesiveness to the substrate, water resistance and solvent resistance tend to be easily reduced. Thus, it is generally preferable to adjust to 50 nm or more. The average particle diameter in the present invention can be measured by particle size distribution measurement using a light diffusion method, and the numerical values in Examples described later were obtained by this method. The particle diameter may be adjusted by appropriately selecting the amount of the emulsifier to be added, the type of the emulsifier and a stirring force when the resin is emulsified in water.

The aqueous resin composition may be produced according to any of the forced emulsification method, the phase inversion emulsification method, the D phase emulsification method and the gel emulsification method, which are known publicly. Upon production, it is possible to use single stirring by a stirring blade, a disper or a homogenizer and complex stirring combining them, and instruments such as a sand mill and a multiaxial extruder. However, in order to make the average particle diameter of the aqueous resin composition 300 nm or less, the phase inversion emulsification method, or the complex stirring having a high shear force, or the method of using the sand mill and the multiaxial extruder is preferable.

In the present invention, a crosslinking agent may be used for the aqueous resin composition depending on the intended use and the purpose. The crosslinking agent means the compound which reacts with a hydroxyl group, a carboxyl group or an amino group present in the modified polyolefin resin, the surfactant and the basic substance and forms a crosslinked structure. The crosslinking agent which is soluble in water can be used, or the crosslinking agent which is dispersed in water by some method can be used. Specific examples thereof may include block isocyanate compounds, aliphatic or aromatic epoxy compounds, amine compounds and amino resins. The method of adding the crosslinking agent is not particularly limited. For example, the crosslinking agent can be added during a step of making aqueous or after making aqueous.

Aqueous acrylic resins, aqueous polyurethane resins, lower alcohols, lower ketones, lower esters, preservatives, leveling agents, antioxidants, light stabilizing agents, ultraviolet light absorbers, dyes, pigments, metal salts and acids can be combined in the aqueous resin composition using the modified polyolefin resin of the present invention depending on the intended used if necessary.

EXAMPLES

Next, the present invention will be described in more detail with reference to Examples and Comparative Examples, but the present invention is not limited thereto. Examples are summarized in Tables.

Example 1

100 Parts by weight of a propylene-based random copolymer (propylene component: 97 mol %, ethylene component: 3 mol %, weight average molecular weight: 80,000, Tm=72° C.) produced using a metallocene catalyst as a polymerization catalyst, 5 parts by weight of maleic anhydride, 3 parts by weight of lauryl methacrylate, 10 parts by weight of an ethylene-α-olefin copolymer (weight average molecular weight: 2,000, main chain ends having an unsaturated bond at one end: 97%, ethylene unit: 100 mol %, Mw/Mn: 1.5) and 1.5 parts by weight of di-t-butyl peroxide were kneaded and reacted using a twin-screw extruder set at 170° C. Pressure reduction and deaeration were performed in the extruder to remove residual unreacted materials. The resulting non-chlorinated modified polyolefin resin had the weight average molecular weight: 67,000, a graft weight of maleic anhydride: 4.2% by weight, and the graft weight of lauryl methacrylate: 2.7% by weight.

Example 2

100 Parts by weight of a propylene-based random copolymer (propylene component: 96 mol %, ethylene component: 4 mol %, weight average molecular weight: 110,000, Tm=95° C.) produced using the metallocene catalyst as the polymerization catalyst, 10 parts by weight of itaconic anhydride, 20 parts by weight of an ethylene-α-olefin copolymer (weight average molecular weight: 12,000, main chain ends having the unsaturated bond at one end: 95%, ethylene unit: 100 mol %, Mw/Mn: 2.2) and 3 parts by weight of dicumyl peroxide were kneaded and reacted using the twin screw extruder set at 180° C. The pressure reduction and the deaeration were performed in the extruder to remove the residual unreacted materials. The resulting non-chlorinated modified polyolefin resin had the weight average molecular weight: 85,000, and the graft weight of itaconic anhydride: 8.4% by weight.

Example 3

100 Parts by weight of a propylene-based random copolymer (propylene component: 75 mol %, ethylene component: 5 mol %, butene component: 20 mol %, weight average molecular weight: 65,000, Tm=70° C.) produced using Ziegler-Natta catalyst as the polymerization catalyst, 12 parts by weight of methyl methacrylate, 3 parts by weight of an ethylene-α-olefin copolymer (weight average molecular weight: 1,500, main chain ends having the unsaturated bond at one end: 98%, ethylene unit: 90 mol %, propylene unit: 10 mol %, Mw/Mn: 1.7) and 3 parts by weight of di-t-butyl peroxide were kneaded and reacted using the twin screw extruder set at 160° C. The pressure reduction and the deaeration were performed in the extruder to remove the residual unreacted materials. The resulting non-chlorinated modified polyolefin resin had the weight average molecular weight: 55,000, and the graft weight of methyl methacrylate: 9.8% by weight.

Example 4

100 Parts by weight of a propylene-based random copolymer (propylene component: 78 mol %, ethylene component: 7 mol %, butene component: 15 mol %, weight average molecular weight: 58,000, Tm=65° C.) produced using Ziegler-Natta catalyst as the polymerization catalyst, 2 parts by weight of itaconic anhydride, 10 parts by weight of an ethylene-α-olefin copolymer (weight average molecular weight: 5,000, main chain ends having the unsaturated bond at one end: 93%, ethylene unit: 100 mol %, Mw/Mn: 1.9) and 2 parts by weight of dilauryl peroxide were kneaded and reacted using the twin screw extruder set at 180° C. The pressure reduction and the deaeration were performed in the extruder to remove the residual unreacted materials. 100 Parts of the resulting modified polyolefin resin and 1500 parts by weight of chloroform were stirred in a reaction pot to which a glass lining had been given, and the modified polyolefin resin was chlorinated by injecting chlorine gas at a flow rate of about 0.2 parts by weight/minute relative to 100 parts by weight of the modified polyolefin resin from a bottom of the reaction pot for about 2 hours under the pressure of 0.2 MPa with irradiating the ultraviolet light. A stabilizing agent (t-butylphenylglycidyl ether) at 1.5% by weight relative to the resin was added to the resulting chloroform solution, which was then solidified using the twin screw extruder set at 90° C. In a three-necked flask equipped with a stirrer, a cooling tube, a thermometer and a dropping funnel, 100 parts by weight of the resulting chlorinated modified polyolefin resin was dissolved at 160° C. Then, 4 parts by weight of cyclohexyl methacrylate was added over 5 minutes with substituting with nitrogen and stirring, and then, 2 parts by weight of dilauryl peroxide was added over 30 minutes. With keeping the temperature inside the system at 160° C., the reaction was continued for additional one hour, and subsequently residual unreacted materials were removed over 30 minutes with reduced pressure and deaeration. The resulting chlorinated modified polyolefin resin had the weight average molecular weight: 49,000, the graft weight of maleic anhydride: 1.6% by weight, the graft weight of cyclohexyl methacrylate: 3.2% by weight, and a content of chlorine: 20.5%.

Example 5

100 Parts by weight of a propylene-based random copolymer (propylene component: 92 mol %, ethylene component: 8 mol %, weight average molecular weight: 83,000, Tm=78° C.) produced using the metallocene catalyst as the polymerization catalyst, 12 parts by weight of maleic anhydride, 8 parts by weight of an ethylene-α-olefin copolymer (weight average molecular weight: 3,500, main chain ends having the unsaturated bond at one end: 95%, ethylene unit: 95 mol %, propylene unit: 5 mol %, Mw/Mn: 2.4) and 5 parts by weight of di-t-butyl peroxide were kneaded and reacted using the twin screw extruder set at 180° C. The pressure reduction and the deaeration were performed in the extruder to remove the residual unreacted materials. 100 Parts of the resulting modified polyolefin resin and 1500 parts by weight of chloroform were stirred in the reaction pot to which the glass lining had been given, and the modified polyolefin resin was chlorinated by injecting the chlorine gas at a flow rate of about 0.2 parts by weight/minute relative to 100 parts by weight of the modified polyolefin resin from the bottom of the reaction pot for about 2 hours under the pressure of 0.2 MPa with irradiating the ultraviolet light. The stabilizing agent (t-butylphenylglycidyl ether) at 1.5% by weight relative to the resin was added to the resulting chloroform solution, which was then solidified using the twin screw extruder set at 90° C. The resulting chlorinated modified polyolefin resin had the weight average molecular weight: 69,000, the graft weight of maleic anhydride: 10.8% by weight, and the content of chlorine: 15.7%.

Example 6

100 Parts by weight of a propylene-based random copolymer (propylene component: 97 mol %, ethylene component: 3 mol %, weight average molecular weight: 72,000, Tm=135° C.) produced using the metallocene catalyst as the polymerization catalyst, 12 parts by weight of an ethylene-α-olefin copolymer (weight average molecular weight: 1,200, main chain ends having the unsaturated bond at one end: 98%, ethylene unit: 100 mol %, Mw/Mn: 1.1) and 5 parts by weight of di-t-butyl peroxide were kneaded and reacted using the twin screw extruder set at 170° C. The pressure reduction and the deaeration were performed in the extruder to remove the residual unreacted materials. 100 Parts of the resulting modified polyolefin resin and 1500 parts by weight of chloroform were stirred in the reaction pot to which the glass lining had been given, and chlorinated by injecting the chlorine gas from the bottom of the reaction pot under the pressure of 0.2 MPa with irradiating the ultraviolet light. The stabilizing agent (t-butylphenylglycidyl ether) at 1.5% by weight relative to the resin was added to the resulting chloroform solution, which was then solidified using the twin screw extruder set at 90° C. In the three-necked flask equipped with the stirrer, the cooling tube, the thermometer and the dropping funnel, 100 parts by weight of the resulting chlorinated modified polyolefin resin was dissolved at 160° C. Then, 5.5 parts by weight of ethyl methacrylate was added over 5 minutes with substituting with nitrogen and stirring, and then, 2 parts by weight of di-t-butyl peroxide was added over 30 minutes. With keeping the temperature inside the system at 160° C., the reaction was continued for additional one hour, and subsequently the residual unreacted materials were removed over 30 minutes with reduced pressure and deaeration. The resulting chlorinated modified polyolefin resin had the weight average molecular weight: 58,000, the graft weight of ethyl methacrylate: 4.9% by weight, and the content of chlorine: 18.9%.

Example 7

100 Parts by weight of a propylene-based random copolymer (propylene component: 98 mol %, ethylene component:

2 mol %, weight average molecular weight: 67,000, Tm=120° C.) produced using the metallocene catalyst as the polymerization catalyst, 15 parts by weight of an ethylene-α-olefin copolymer (weight average molecular weight: 4,000, main chain ends having the unsaturated bond at one end: 94%, ethylene unit: 100 mol %, Mw/Mn: 2.5) and 5 parts by weight of dilauryl peroxide were kneaded and reacted using the twin screw extruder set at 170° C. The pressure reduction and the deaeration were performed in the extruder to remove the residual unreacted materials. 100 Parts of the resulting modified polyolefin resin and 1500 parts by weight of chloroform were stirred in the reaction pot to which the glass lining had been given, and chlorinated by injecting the chlorine gas from the bottom of the reaction pot under the pressure of 0.2 MPa with irradiating the ultraviolet light. The stabilizing agent (t-butylphenylglycidyl ether) at 1.5% by weight relative to the resin was added to the resulting chloroform solution, which was then solidified using the twin screw extruder set at 90° C. The resulting chlorinated modified polyolefin resin had the weight average molecular weight: 55,000, and the content of chlorine: 23.2%.

Example 8

In a four-necked flask equipped with the stirrer (comprising a stirring blade), the cooling tube, the thermometer and the dropping funnel, 100 parts by weight of the modified polyolefin resin obtained in Example 1 and 10 parts by weight of polyoxyethylene alkyl ether as the surfactant were added and kneaded at 120° C. for 30 minutes. Then, 10 parts by weight of dimethylethanolamine was added over 5 minutes and kept for 5 minutes, and then, 300 parts by weight of ion-exchange water at 90° C. was added over 40 minutes. The mixture was subsequently cooled to the room temperature to obtain an aqueous resin composition. The aqueous resin composition had a solid content: 30% by weight, pH: 7.5, and the average particle diameter: 122 nm.

Example 9

Example 1 was repeated in the same way as in Example 1, except that an amount of the added ethylene-α-olefin copolymer was 40 parts by weight. The resulting non-chlorinated modified polyolefin resin had the weight average molecular weight: 66,000, the graft weight of maleic anhydride: 3.5% by weight, and the graft weight of lauryl methacrylate: 2.2% by weight.

Example 10

Example 1 was repeated in the same way as in Example 1, except that an ethylene-α-olefin copolymer (weight average molecular weight: 1,800, main chain ends having the unsaturated bond at one end: 94%, ethylene unit: 85 mol %, propylene unit: 15 mol %, Mw/Mn: 3.3) was added. The resulting non-chlorinated modified polyolefin resin had the weight average molecular weight: 68,000, the graft weight of maleic anhydride: 3.6% by weight, and the graft weight of lauryl methacrylate: 2.9% by weight.

Example 11

Example 1 was repeated in the same way as in Example 1, except that an ethylene-α-olefin copolymer (weight average molecular weight: 35,000, main chain ends having the unsaturated bond at one end: 96%, ethylene unit: 100 mol %, Mw/Mn: 2.0) was added. The resulting non-chlorinated modified polyolefin resin had the weight average molecular weight: 64,000, the graft weight of maleic anhydride: 3.3% by weight, and the graft weight of lauryl methacrylate: 2.7% by weight.

Comparative Example 1

Example 1 was repeated in the same way as in Example 1, except that an ethylene-α-olefin copolymer (weight average molecular weight: 2,400, main chain ends having the unsaturated bond at one end: 25%, ethylene unit: 100 mol %, Mw/Mn: 2.4) was added. The resulting non-chlorinated modified polyolefin resin had the weight average molecular weight: 66,000, the graft weight of maleic anhydride: 3.5% by weight, and the graft weight of lauryl methacrylate: 3.0% by weight.

Comparative Example 2

Example 1 was repeated in the same way as in Example 1, except that the amount of the ethylene-α-olefin copolymer to be added was 0 parts by weight.

Comparative Example 3

Example 1 was repeated in the same way as in Example 1, except that the amounts of maleic anhydride and lauryl methacrylate to be added were 0 parts by weight.

Concerning the non-chlorinated modified polyolefin resins obtained in Examples 1 to 3 and 9 to 11 and Comparative Examples 1 to 3, 15% by weight of the non-chlorinated modified polyolefin resin was dissolved in a solution of methylcyclohexane/methyl ethyl ketone (8/2) to prepare a solution composition. Concerning the chlorinated modified polyolefin resins obtained in Examples 4 to 7, 20% by weight of the chlorinated modified polyolefin resin was dissolved in a solution of toluene/cyclohexane (7/3) to prepare a solution composition. Concerning the resulting solution compositions, the following tests 1 to 3 were performed. Concerning the solution compositions of Examples 1, 5 and 10 and Comparative Examples 1 to 3, the test 4 was also performed. Meanwhile, concerning Example 8, the following tests 2 and 3 were performed using the resulting aqueous resin composition.

(Test 1: Solvent Solubility Test)

The above modified polyolefin resin compositions according to the present invention were left stand in an incubator at 23.5° C., and after one week, characters of the solutions were visually observed. Results are shown in Table 1.

Evaluation Criteria

A: No precipitate and no grain are observed.

B: Some precipitates and grains are observed.

C: Many grains occur, or insoluble or separation into two layers.

N: Not tested (Test 2: Adhesion Strength Test 1)

Adhesion strength of the modified polyolefin resins according to the present invention by thermal compression bonding was evaluated using polypropylene (PP) and polyethylene (low density polyethylene [LDPE], linear low density polyethylene [LLDPE] and high density polyethylene [HDPE]) as the olefin substrates, and polyethylene terephthalate (PET) as the polar substrate.

The above sample solution was applied onto biaxially-oriented polypropylene films to which no surface treatment was given and onto low density polyethylene (LDPE) films, linear low density polyethylene (LLDPE) films and high density polyethylene (HDPE) films to which no surface treatment was given using #10 Meyer bar, and dried at room temperature for 24 hours. After drying, a coated surface was lapped on the coated surface of the same film, and they were sealed with heat using No. 276 heat seal tester (supplied from Yasuda Seiki Seisakusho Ltd.) under the condition at 2.0 kgf/cm$^2$, at 90° C. or 110° C. (90° C. for PP films, 140° C. only for PET films) for 10 seconds. Each test piece was cut to have a width of 15 mm, peeled at 100 mm/minute using a tensile tester, and its peel strength was measured. The test was performed three times, and a mean thereof was a result. The results are shown in Table 1.

(Test 3: Tack Property Test)

The above modified polyolefin resin composition was coated on the biaxially-oriented polypropylene film to which no surface treatment was given using #10 Meyer bar, and dried at room temperature for 24 hours. After drying, the film was folded to mutually lap the coated surfaces. The folded film was pushed lightly, and then peeled. The tack property was evaluated by peeling easiness. The results are shown in Table 1.

Evaluation Criteria

None: Immediately after releasing fingers, the film was dissociated and no tack property was observed.

Weak: Pausing a moment after releasing the fingers, the film was dissociated.

Medium: Several second after releasing the fingers, the film was dissociated.

Strong: Even when 10 seconds or more passed, the film was not dissociated.

(Test 4: Adhesion Strength Test 2)

The adhesion strength of the modified polyolefin resin according to the present invention dried at low temperature was evaluated using polypropylene (PP), low density polyethylene (LDPE) and high density polypropylene (HDPE) as the polyolefin substrate.

The above sample solution was spray-coated on a ultrahigh rigid polypropylene plate to which no surface treatment was given and on a low density polyethylene (LDPE) plate and a high density polypropylene (HDPE) plate, to which no surface treatment was given, so that a dry coating film thickness was 10 μm or more and 15 μm or less, and dried at 90° C. for 30 minutes. Each test body was dried at room temperature for 3 days, subsequently a cellophane adhesive tape was adhered to the surface of the coating film, then the cellophane adhesive tape of 10 cm was peeled in a direction of 180° at a low speed (about one second) or a high speed (in a moment), and the amount of the coating film left on a peeled portion was evaluated. The results are shown in Table 2.

Evaluation Criteria

A: The amount of the residual coating film was 100%.

B: The amount of the residual coating film was 50% or more and less than 100%.

C: The amount of the residual coating film was less than 50%.

[Table 1]

TABLE 1

| | | TEST RESULT | | | | |
|---|---|---|---|---|---|---|
| | | ADHESION STRENGTH TEST 1(gf/15 mm) PET: 140° C., PP: 90° C., PE: 90° C./110° C. | | | | |
| | TACK PROPERTY | PET | PP | LDPE | LLDPE | HDPE | SOLVENT SOLUBILITY |
| EXAMPLE 1 | NONE | 320 | 440 | 140/560 | 580/680 | 650/870 | A |
| EXAMPLE 2 | NONE | 320 | 420 | 130/510 | 550/620 | 610/800 | A |
| EXAMPLE 3 | WEAK | 350 | 450 | 180/570 | 650/720 | 780/950 | A |
| EXAMPLE 4 | NONE | 280 | 370 | 100/410 | 490/570 | 510/640 | A |
| EXAMPLE 5 | WEAK | 260 | 390 | 110/450 | 520/580 | 560/700 | A |
| EXAMPLE 6 | WEAK | 290 | 380 | 110/440 | 510/570 | 550/710 | A |
| EXAMPLE 7 | WEAK | 270 | 340 | 100/420 | 450/560 | 500/650 | A |
| EXAMPLE 8 | NONE | 300 | 330 | 120/540 | 550/680 | 580/870 | — |
| EXAMPLE 9 | NONE | 120 | 150 | 70/570 | 250/470 | 660/740 | C |
| EXAMPLE 10 | STRONG | 310 | 390 | 80/340 | 340/580 | 680/870 | A |
| EXAMPLE 11 | NONE | 100 | 210 | 50/280 | 180/370 | 600/710 | C |
| COMP. EXAMPLE 1 | WEAK | 390 | 320 | 20/200 | 70/420 | 540/650 | C |
| COMP. EXAMPLE 2 | MEDIUM | 400 | 350 | 100/130 | 20/500 | 70/490 | A |
| COMP. EXAMPLE 3 | WEAK | 20 | 20 | 80/310 | 60/350 | 370/420 | C |

※COMP. EXAMPLE: COMPARATIVE EXAMPLE

[Table 2]

TABLE 2

| | TEST RESULT | | |
|---|---|---|---|
| | ADHESION STRENGTH TEST 2 (LOW-SPEED PEELING/ HIGH-SPEED PEELING) | | |
| | PP | LDPE | HDPE |
| EXAMPLE 1 | A/A | A/A | A/A |
| EXAMPLE 5 | A/A | B/B | B/A |
| EXAMPLE 10 | A/A | B/A | A/A |
| COMP. EXAMPLE 1 | A/A | C/C | A/A |
| COMP. EXAMPLE 2 | A/A | C/C | C/C |
| COMP. EXAMPLE 3 | C/C | C/C | C/C |

As is evident from Tables 1 and 2, the modified polyolefin resin provided by the present invention is excellent in adhesiveness between poorly adhesive polyolefin substrates to which no surface treatment has been given, particularly between the polyethylene substrates each other. In particular, it has the equivalent adhesive force to low density polyethylene (LDPE), linear low density polyethylene (LLDPE) and high density polypropylene (HDPE), to which the equivalent adhesive force has been difficult to be given. Furthermore, the tack is low, and the excellent adhesiveness is developed by drying or the thermal compression bonding at relatively low temperature.

The invention claimed is:

1. A modified polyolefin resin comprising:
   a polyolefin resin which is (1) grafted with (A-1) and/or chlorinated; and (2) grafted with (B):
   (A-1) one or more polarity imparting agents selected from the group consisting of an unsaturated carboxylic acid, a derivative of an unsaturated carboxylic acid, an anhydride of an unsaturated carboxylic acid, and a (meth) acrylic compound; and
   (B) an ethylene-α-olefin copolymer of which 90% or more molecules have an unsaturated bond at one end of the main chain of said molecules.

2. The modified polyolefin resin according to claim 1, wherein said polyolefin resin is at least one selected from the group consisting of an ethylene-propylene copolymer, an propylene-butene copolymer and an ethylene-propylene-butene copolymer.

3. The modified polyolefin resin according to claim 1, wherein said (A-1) polarity imparting agent is a combination of an unsaturated carboxylic anhydride and an methacrylate ester.

4. The modified polyolefin resin according to claim 1, wherein said polyolefin resin comprises 60 mol % or more propylene as a component composition.

5. The modified polyolefin resin according to claim 1, wherein the polyolefin resin is at least chlorinated and the amount of chlorine in the modified polyolefin resin is 2 weight % to 35 weight %.

6. The modified polyolefin resin according to claim 1, wherein an amount of said unsaturated carboxylic anhydride in the modified polyolefin resin is 0.5 weight % to 20 weight %, and an amount of said methacrylate ester in the modified polyolefin resin is 0.1 weight % to 30 weight %.

7. The modified polyolefin resin according to claim 1, wherein the polyolefin is chlorinated.

8. The modified polyolefin resin according to claim 1, wherein the polarity imparting agent is an unsaturated carboxylic acid.

9. The modified polyolefin resin according to claim 1, wherein the polarity imparting agent is a derivative of an unsaturated carboxylic acid.

10. The modified polyolefin resin according to claim 1, wherein the polarity imparting agent is an anhydride of an unsaturated carboxylic acid.

11. The modified polyolefin resin according to claim 1, wherein the polarity imparting agent is a (meth) acrylic compound.

12. The modified polyolefin resin according to claim 11, wherein the (meth) acrylic compound comprises (meth) acrylic acid, methyl(meth)acrylate, ethyl(meth)acrylate, n-butyl(meth)acrylate, cyclohexyl(meth)acrylate, hydroxyethyl(meth)acrylate, isobornyl(meth)acrylate, glycidyl (meth)acrylate, octyl(meth)acrylate, lauryl(meth)acrylate, tridecyl(meth)acrylate, stearyl(meth)acrylate, benzyl(meth)acrylate, phenyl(meth)acrylate, dimethylaminoethyl(meth)acrylate, diethylaminoethyl(meth)acrylate, 2-hydroxyethyl (meth)acrylate, N,N-dimethylaminoethyl(meth)acrylate, acetoacetoxyethyl(meth)acrylate, N-methyl(meth)acrylamide, N-ethyl(meth)acrylamide, N-propyl(meth)acrylamide, N-isopropyl(meth)acrylamide, N-butyl(meth)acrylamide, N-isobutyl(meth)acrylamide, N-t-butyl(meth)acrylamide, N,N-dimethyl(meth)acrylamide, N,N-dimethylaminopropyl (meth)acrylamide, N,N-methylene-bis(meth)acrylamide, N-methylol(meth)acrylamide, hydroxyethyl(meth)acrylamide or (meth)acryloylmorpholine.

13. The modified polyolefin resin according to claim 11, wherein the (meth) acrylic compound is methyl(meth)acrylate, ethyl(meth)acrylate, cyclohexyl(meth)acrylate or lauryl (meth)acrylate.

14. The modified polyolefin resin according to claim 11, wherein the weight average molecular weight of the ethylene-α-olefin copolymer is 800 to 30,000.

15. An aqueous resin composition comprising:
    an aqueous solvent, and
    the modified polyolefin resin according to claim 1.

16. The aqueous resin composition according to claim 15, wherein said modified polyolefin resin is emulsified in said aqueous solvent.

17. The aqueous resin composition according to claim 15, wherein pH value thereof is 6-10.

18. An organic solvent resin composition comprising:
    an organic solvent and
    the modified polyolefin resin according to claim 1.

* * * * *